(12) United States Patent
Berlingieri et al.

(10) Patent No.: US 11,167,614 B2
(45) Date of Patent: Nov. 9, 2021

(54) PROGRESSIVE RATE LEAF SPRING FOR VEHICLE SUSPENSION SYSTEM

(71) Applicant: RASSINI SUSPENSIONES, S.A. DE C.V., Del. Miguel Hidalgo (MX)

(72) Inventors: Anthony Berlingieri, Plymouth, MI (US); José Guadalupe Ruiz Juárez, Coahuila (MX); Aaron N. Johnson, Westland, MI (US); James N. Zeimet, Commerce Township, MI (US); Juan Jose Wong, Coahuila (MX); Ramón Heberto Diego Guedea, Ann Arbor, MI (US)

(73) Assignee: RASSINI SUSPENSIONES, S.A. DE C.V.

( * ) Notice: Subject to any disclaimer, the term of this patent is extended or adjusted under 35 U.S.C. 154(b) by 0 days.

(21) Appl. No.: 16/793,477

(22) Filed: Feb. 18, 2020

(65) Prior Publication Data
US 2020/0262264 A1    Aug. 20, 2020

Related U.S. Application Data

(60) Provisional application No. 62/807,519, filed on Feb. 19, 2019.

(51) Int. Cl.
*B60G 11/12* (2006.01)
*B60G 17/02* (2006.01)
*B60G 11/10* (2006.01)

(52) U.S. Cl.
CPC ............ *B60G 17/023* (2013.01); *B60G 11/10* (2013.01); *B60G 2202/114* (2013.01); *B60G 2204/41* (2013.01)

(58) Field of Classification Search
CPC .................. B60G 17/023; B60G 11/10; B60G 2202/114; B60G 2204/41
USPC ....................... 280/124.17, 124.175
See application file for complete search history.

(56) References Cited

U.S. PATENT DOCUMENTS

| | | | | |
|---|---|---|---|---|
| 3,799,562 | A * | 3/1974 | Hinchliff | B60G 5/047 280/682 |
| 4,412,690 | A * | 11/1983 | Prokop | B60G 5/047 267/262 |
| 4,718,693 | A * | 1/1988 | Booher | B60G 11/44 267/149 |
| 7,722,065 | B2 * | 5/2010 | Platner | F16F 1/3686 280/124.175 |
| 2013/0140786 | A1 * | 6/2013 | Enomoto | B60G 11/12 280/124.175 |
| 2017/0203625 | A1 * | 7/2017 | Drabon | B60G 11/12 |
| 2019/0061454 | A1 * | 2/2019 | Rochell | B60G 11/10 |
| 2019/0111749 | A1 * | 4/2019 | Simon | B60G 11/10 |
| 2019/0308477 | A1 * | 10/2019 | Hacker | F16F 1/3683 |
| 2020/0282785 | A1 * | 9/2020 | Oh | B60G 9/02 |

* cited by examiner

*Primary Examiner* — Toan C To
(74) *Attorney, Agent, or Firm* — Dickinson Wright PLLC

(57) ABSTRACT

A variable rate leaf spring vehicle suspension system is provided. The system includes a vehicle frame. The system also includes a single leaf spring extending from a first end to a second end. The system further includes a shackle operatively coupled to the vehicle frame and defining a channel, the second end of the leaf spring disposed within the channel of the shackle.

13 Claims, 9 Drawing Sheets

PROGRESSIVE RATE LEAF SPRING FOR VEHICLE SUSPENSION SYSTEM

CROSS-REFERENCE TO RELATED APPLICATION

This application claims priority to U.S. Provisional Patent Application No. 62/807,519, filed on Feb. 19, 2019, the disclosure of which is incorporated by reference herein in its entirety.

FIELD OF THE INVENTION

This invention relates generally to leaf spring suspension systems for vehicles.

BACKGROUND

Leaf spring systems have for many years been used for the suspension of wheeled vehicles. The central element of a leaf spring suspension system for a vehicle is termed a "semi-elliptical" spring configured as an arc-shaped length of spring steel having a substantially rectangular cross-section. At the center of the arc is provided an arrangement for coupling to the axle of the vehicle. At the ends are provided coupler holes for attaching the spring to the vehicle body. For heavy vehicles, leaf springs are stacked on one another to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point. Unfortunately, typical steel leaf spring arrangements are heavy.

Some spring arrangements include features that provide a multi-plate arrangement with a multi-stage spring rate that dictates, in part, the response to certain driving maneuvers that is felt by an occupant of the vehicle. The multi-plate, multi-stage spring rate designs often suffer from abrupt changes that are felt by the user in an undesirable manner.

SUMMARY OF THE INVENTION

According to an aspect of the disclosure, a variable rate leaf spring vehicle suspension system is provided. The system includes a vehicle frame. The system also includes a single leaf spring extending from a first end to a second end. The system further includes a tension shackle operatively coupled to the vehicle frame and defining a channel, the second end of the leaf spring disposed within the channel of the tension shackle.

According to another aspect of the disclosure, a variable rate leaf spring vehicle suspension system includes a vehicle frame. The system also includes a single leaf spring extending from a first end to a second end. The system further includes a compression shackle operatively coupled to the vehicle frame, a first portion of the compression shackle defining a channel that the second end of the leaf spring is disposed within, a second portion of the compression shackle pivotable relative to the first portion. The system yet further includes a shackle bumper coupled to the first portion of the compression shackle, the shackle bumper spaced from the second portion of the compression shackle in a first condition of the leaf spring, and in contact with the compression shackle in a second condition of the leaf spring, contact between the shackle bumper and the vehicle frame configured to gradually increase the spring rate of the leaf spring.

These and other advantages and features will become more apparent from the following description taken in conjunction with the drawings

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
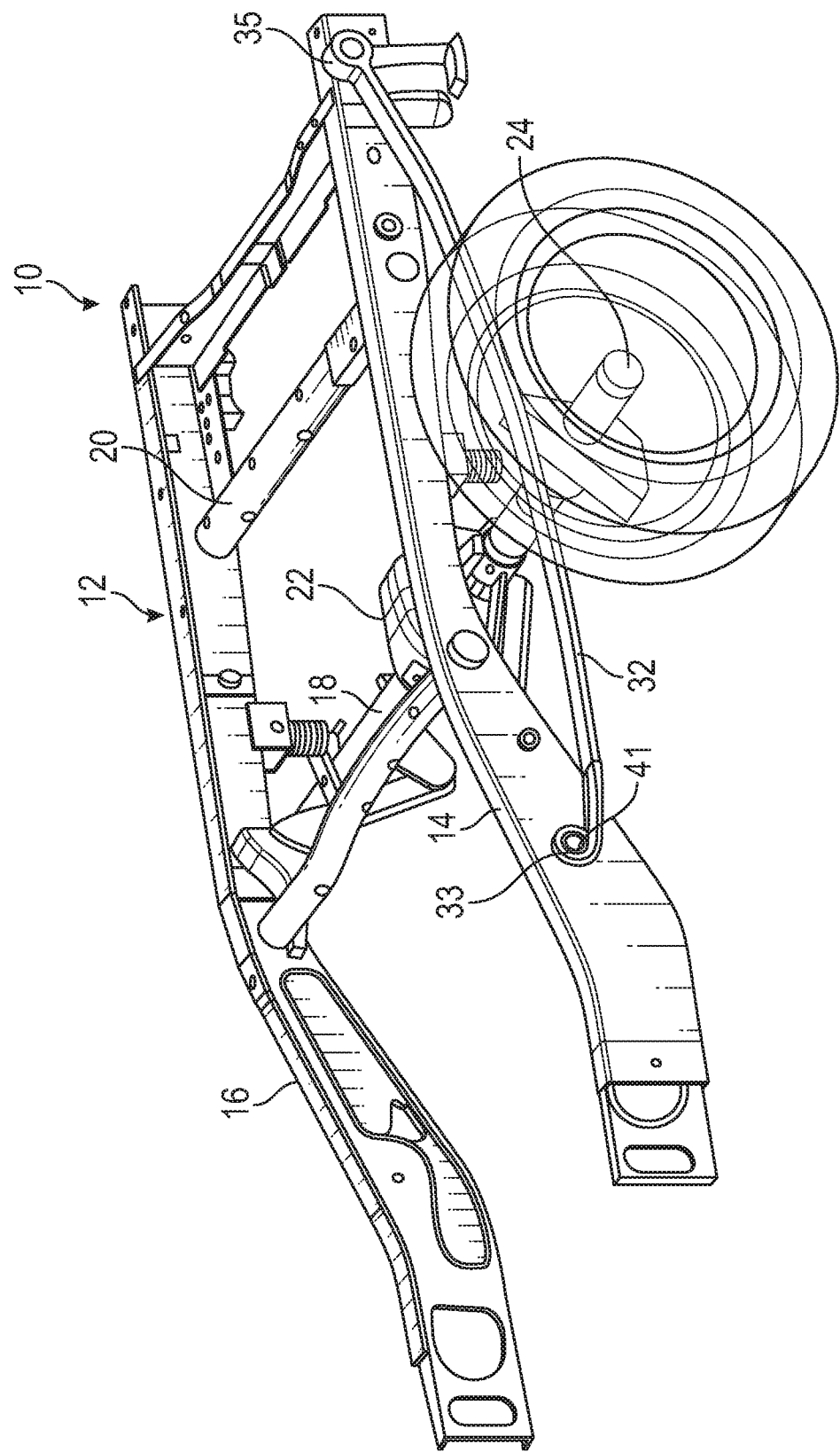
FIG. 1 is a perspective view of a vehicle suspension system.

Referring to FIG. 1, illustrated is a vehicle suspension system 10 having a chassis generally designated with numeral 12. The chassis 12 includes a first chassis rail 14 and a second chassis rail 16 that are arranged substantially parallel to each other. The first and second chassis rails 14, 16 are coupled to each another by at least one cross brace, such as a first cross brace 18 and a second cross brace 20, as shown. A differential drive arrangement 22 is fixedly coupled to the chassis 12 and converts the rotary motion of a drive shaft (not shown) to substantially orthogonal rotary motion at axle 24. The axle 24 includes an associated pair of universal joints (not specifically designated) that are arranged to be proximal and distal with respect to the differential drive arrangement 22. Thus, the axle 24 has an associated longitudinal axis to accommodate transaxial motion. It is to be appreciated that the axle 24 refers to a pair of half shafts in some embodiments. The half shafts may be disposed within a single sleeve or uncovered.

A leaf spring 32 is operatively coupled at a first end 33 and a second end 35 to the chassis rail 14. In some embodiments, the leaf spring 32 is operatively coupled, at least in part, to the chassis rail 14 with an eye spring bushing arrangement 41 at the first end 33. For purposes of discussion, only leaf spring 32 has been described in detail, but it is to be appreciated that a corresponding leaf spring is located on an opposing side of the chassis 12 proximate chassis rail 14.

The above-described spring 32 may be referred to as a "semi-elliptical" spring configured as an arc-shaped length segment. The spring is formed of a composite material to reduce the weight of the leaf spring 32 in some embodiments. However, it is to be appreciated that spring 32 may be formed of steel in other embodiments.

Figure 2:
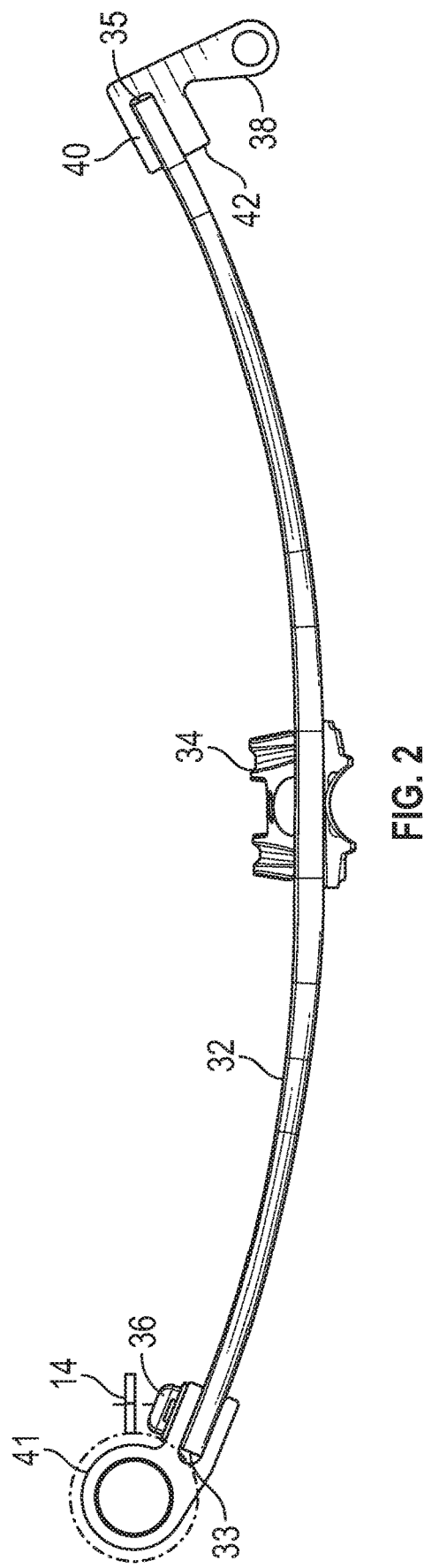
FIG. 2 is a side, elevational view of a leaf spring of the vehicle suspension system according to an embodiment.

Referring now to FIG. 2, a first embodiment of the leaf spring 32 is illustrated in greater detail. Disposed between the first end 33 and the second end 35 of the leaf spring 32 is a retention assembly 34 to operatively couple (directly or indirectly) the leaf spring 32 to the axle 24. The retention assembly 34 may be a cage U-bolt plate, or any other suitable structure for operatively coupling the leaf spring 32 to the axle 24. A bumper 36 is located proximate the first end 33 of the leaf spring 32. The bumper 36 may be operatively coupled to, or integrally formed with, the eye spring bushing arrangement 41 (as illustrated) or the leaf spring 32 itself. Location of the bumper 36 being proximate to the first end 33 of the leaf spring 32 is defined by the bumper 36 being located closer to the first end 33 relative to a distance between the bumper 36 and a mid-point of the leaf spring 32. The bumper 36 may be formed of any suitable resilient material, including a polymeric material or rubber, for example.

Figure 3:
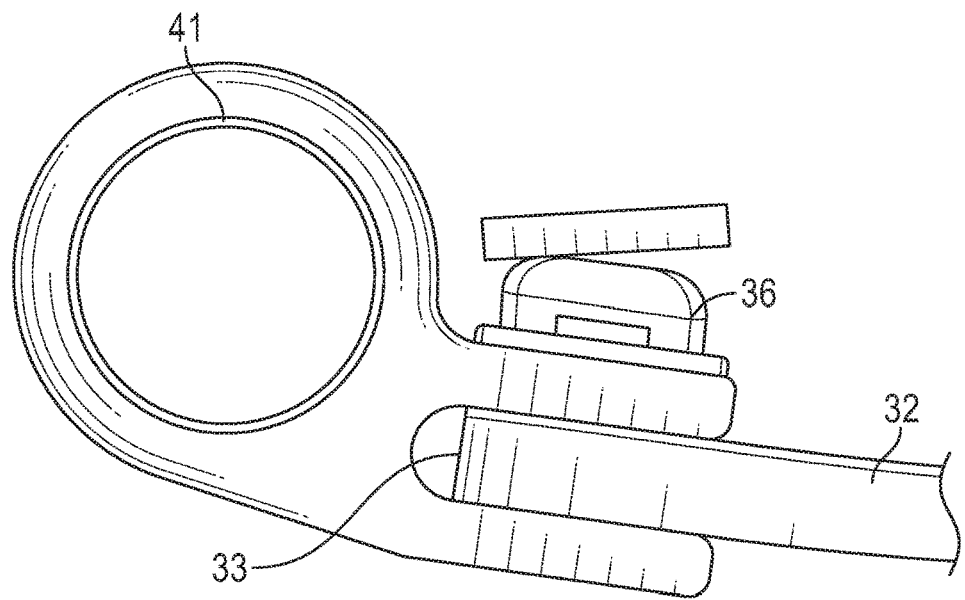
FIG. 3 is a side, elevational view of a first end of the leaf spring of FIG. 2 having a bumper thereon.

FIG. 3 illustrates the first end 33 of the leaf spring 32 in greater detail. The bumper 36 is positioned on a top side of the eye spring bushing arrangement 41 to contact the frame (e.g., chassis rail 14) during vertical deflections of the leaf spring 32 in response to various movements of the vehicle, such as acceleration, braking, lateral movement due to turning maneuvers, movement due to changing road surfaces, etc. It is contemplated that the bumper 36 is disposed on another structure that the leaf spring 32 is engaged with, or even the leaf spring 32 itself. The bumper 36 is shown in close proximity to, or engagement with, the chassis rail 14 in FIG. 3. The resilient material of the bumper 36 softens the engagement of the bumper (and therefore the eye spring 41 and leaf spring 32) with the vehicle frame.

Figure 4:
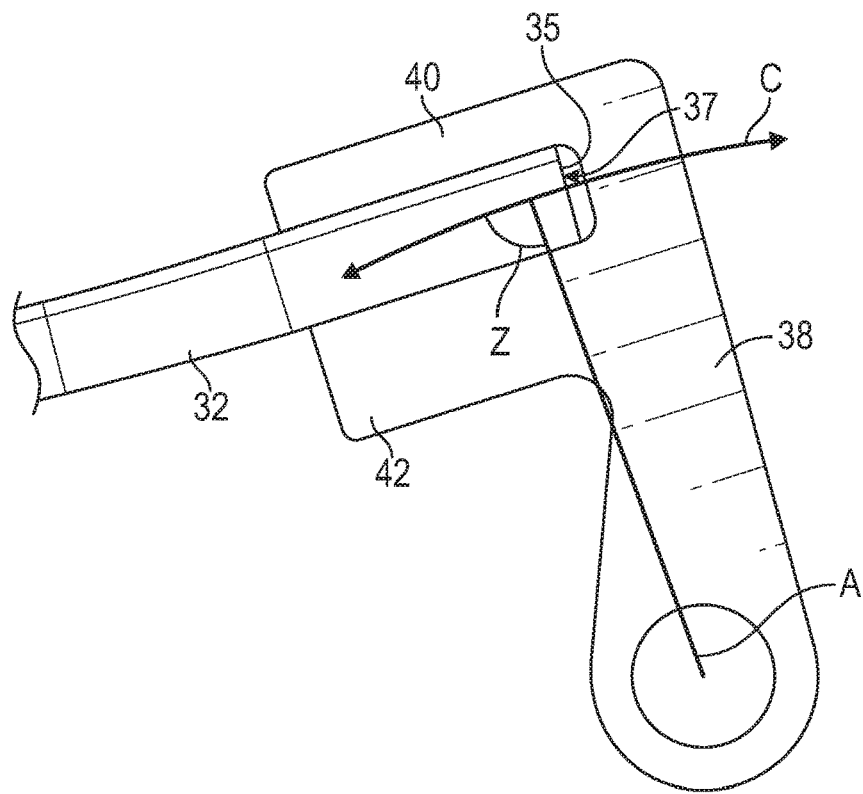
FIG. 4 is a side, elevational view of a second end of the leaf spring of FIG. 2 disposed in a tension shackle.

Referring again to FIG. 2, as well as FIG. 4, the second end 35 of the leaf spring 32 is disposed within a channel 37 defined by a tension shackle 38 that is coupled to a portion of the vehicle frame, such as chassis rail 14. The tension shackle 38 is pivotably coupled to the vehicle frame about axis A in any suitable manner. In the illustrated embodiment, the tension shackle 38 includes a first leg 40 and a second leg 42 that are spaced from each other to define channel 37. The channel 37 is dimensioned to effectively clamp the second end 35 of the leaf spring 32 therein.

Engagement of the bumper 36 with the chassis rail 14 in response to spring deflection relative to chassis rail 14 initiates a second spring rate of the leaf spring 32 to provide desirable spring characteristics that facilitate specified suspension dynamics. The precise location of the bumper 36 along the length of the leaf spring 32 may be adjusted to determine how much spring deflection is required before contact between the bumper 36 and the chassis rail 14 occurs. Additionally, the tension shackle 38 that clamps the second end 35 of the leaf spring 32 allows the "effective length" of the leaf spring 32 to be further shortened, thereby increasing the spring rate of leaf spring 32 during deflection. Reducing the effective length of the leaf spring 32 refers to changing the fulcrum location of the leaf spring 32 from outermost ends to a different (i.e., inward) location.

Figure 5:
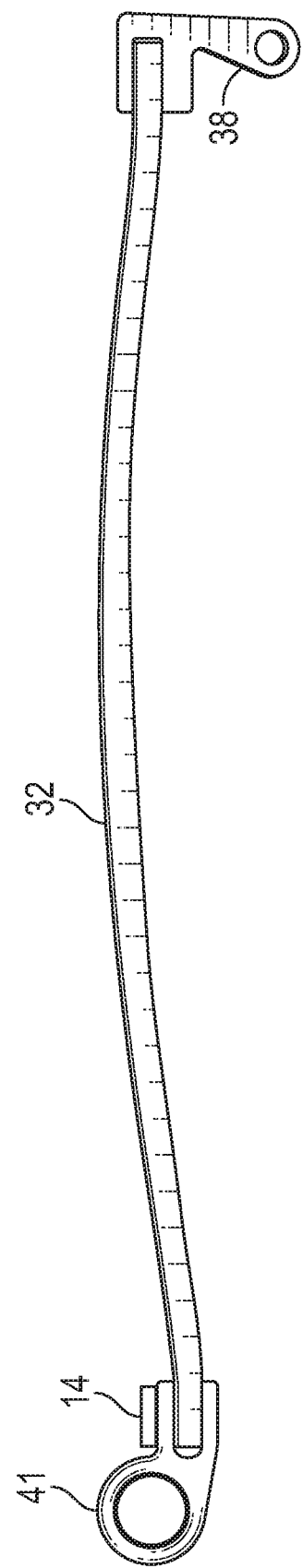
FIG. 5 is a side, elevational view of the leaf spring of FIG. 2 deflecting during operation.
Figure 6:
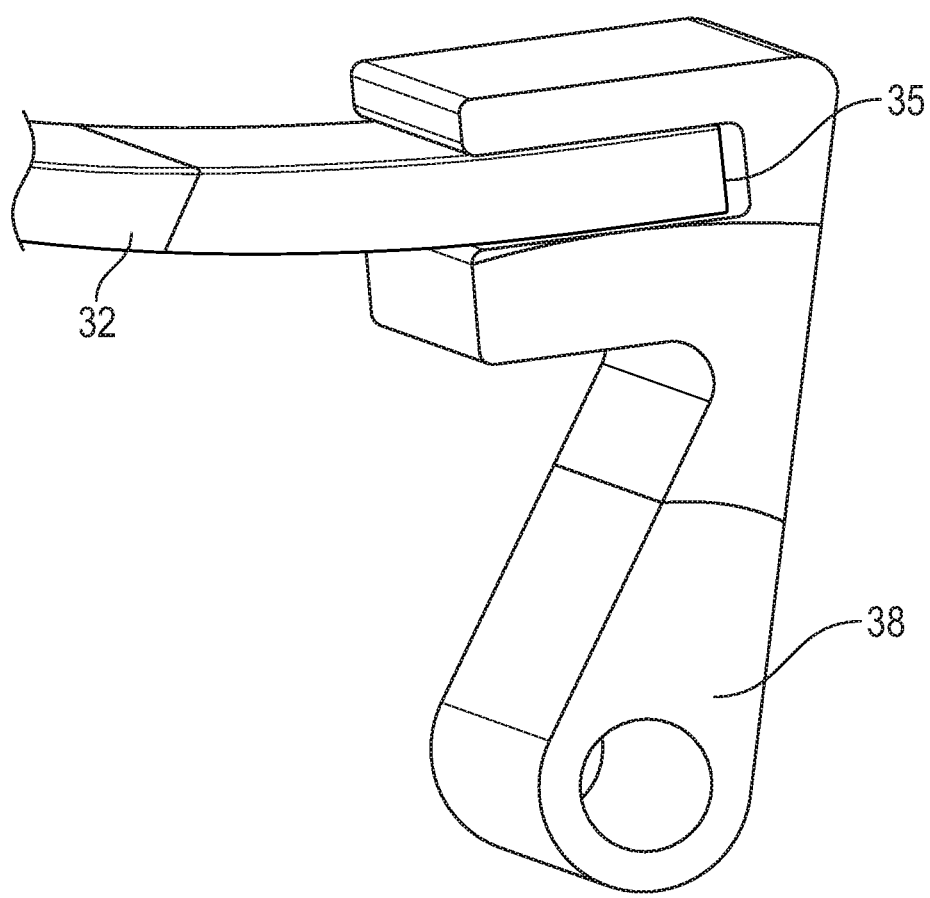
FIG. 6 is a perspective view of the second end of the leaf spring of FIG. 2 deflecting during operation.

The tension shackle 38 pivots about axis A during deflection of the leaf spring, as shown in FIG. 4, to gradually decrease the effective length of the leaf spring 32, thereby increasing the rate of the leaf spring 32. With the bumper 36 and the tension shackle 38, each side 33, 35 of the leaf spring 32 provides parameters to adjust the rate progression without having to change the curvature or thickness profile of the leaf spring 32. By controlling the engagement of the bumper 36 and parameters of the tension shackle 38, the seat angle of the leaf spring 32 can be adjusted to a desired direction. The height of the bumper 36 and resiliency of the bumper material are factors that facilitate customization of the rate progression. Regarding the tension shackle 38, the radius R defined by the distance between axis A and arc length C (FIG. 4), as well as the clamp length L, similarly facilitates customization. An additional customization parameter is defined by the angle between axis A and the portion of arc length C that is along the leaf spring 32. FIGS. 5 and 6 illustrate the leaf spring 32 during deflection.

Figure 7:
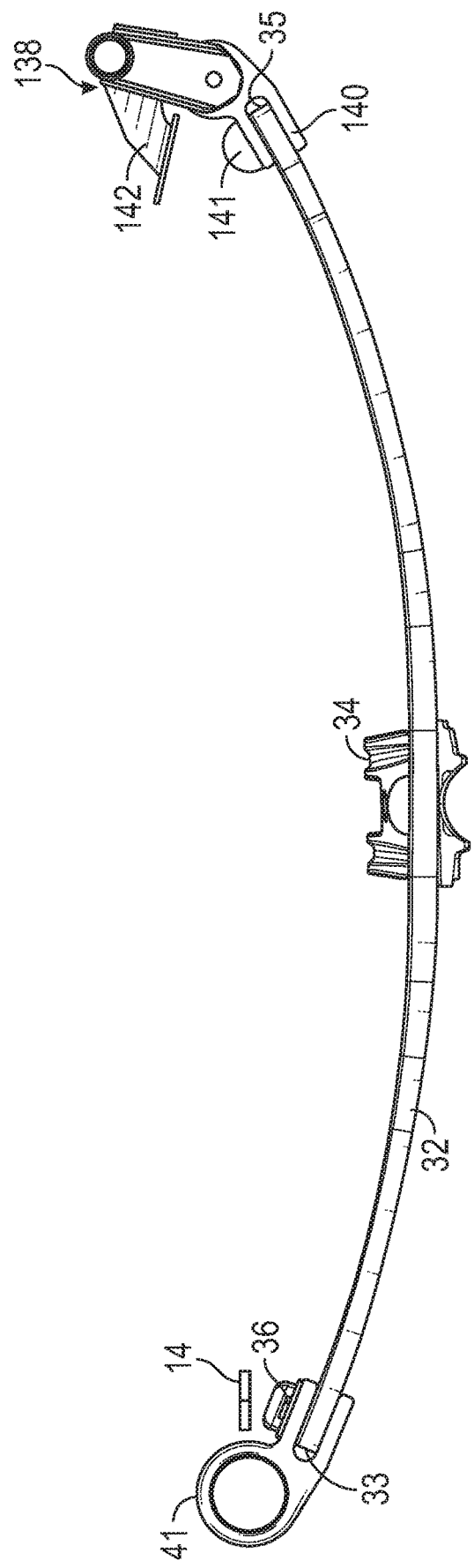
FIG. 7 is a side, elevational view of a leaf spring of the vehicle suspension system according to another embodiment.

Referring now to FIG. 7, as with the embodiments of FIGS. 2-6, the first end 33 of the leaf spring 32 includes a bumper 36 is positioned on a top side of the eye spring bushing arrangement 41 to contact the frame (e.g., chassis rail 14) during vertical deflections of the leaf spring 32 in response to various movements of the vehicle, such as acceleration, braking, lateral movement due to turning maneuvers, movement due to changing road surfaces, etc. It is contemplated that the bumper 36 is disposed on another structure that the leaf spring 32 is engaged with, or even the leaf spring 32 itself. The bumper 36 is shown spaced from the vehicle frame in FIG. 7 and in close proximity to, or engagement with, the chassis rail 14 in FIG. 10. The resilient material of the bumper 36 softens the engagement of the bumper (and therefore the eye spring 41 and leaf spring 32) with the vehicle frame.

Figure 8:
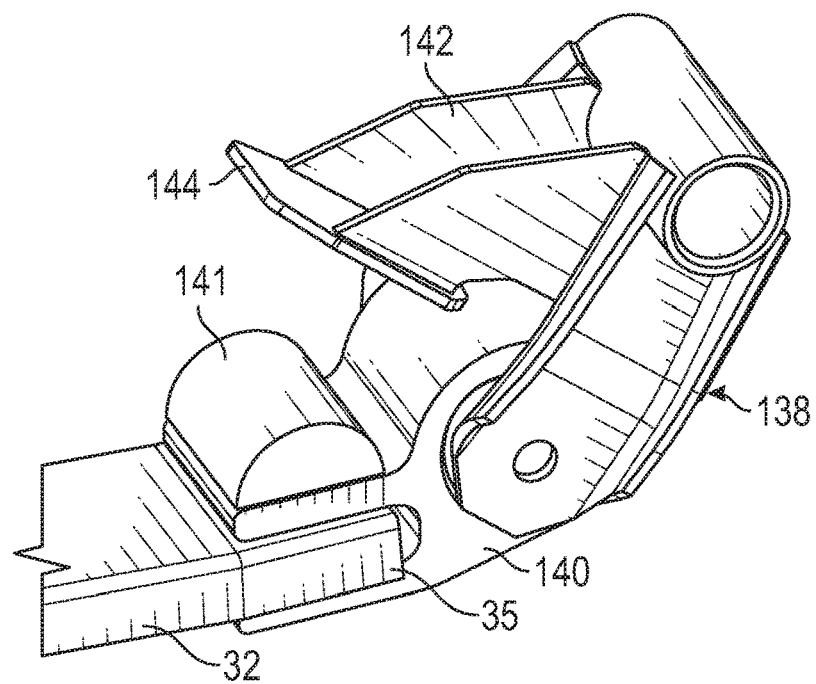
FIG. 8 is a perspective view of a second end of the leaf spring of FIG. 7 disposed in a compression shackle.
Figure 9:
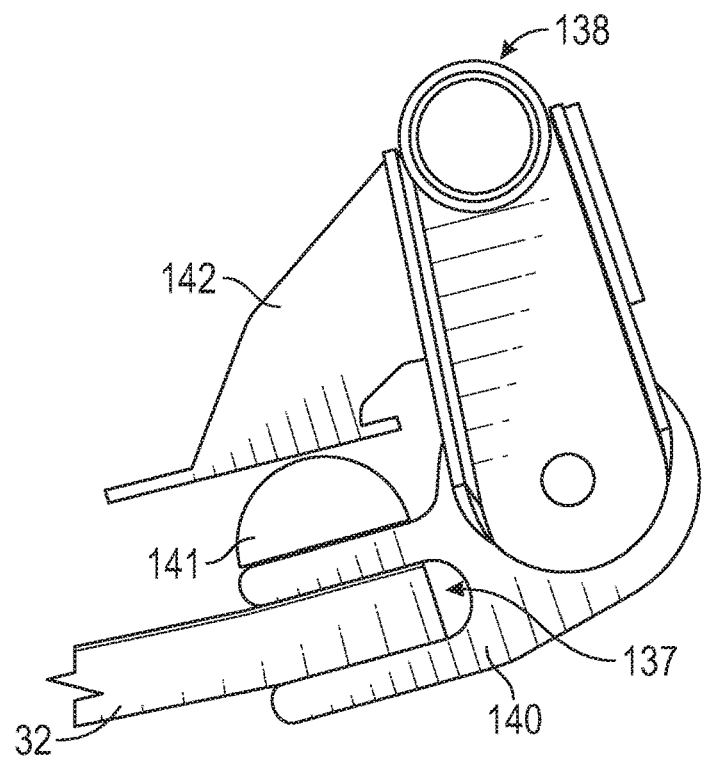
FIG. 9 is a side, elevational view of the leaf spring of FIG. 7.
Figure 10:
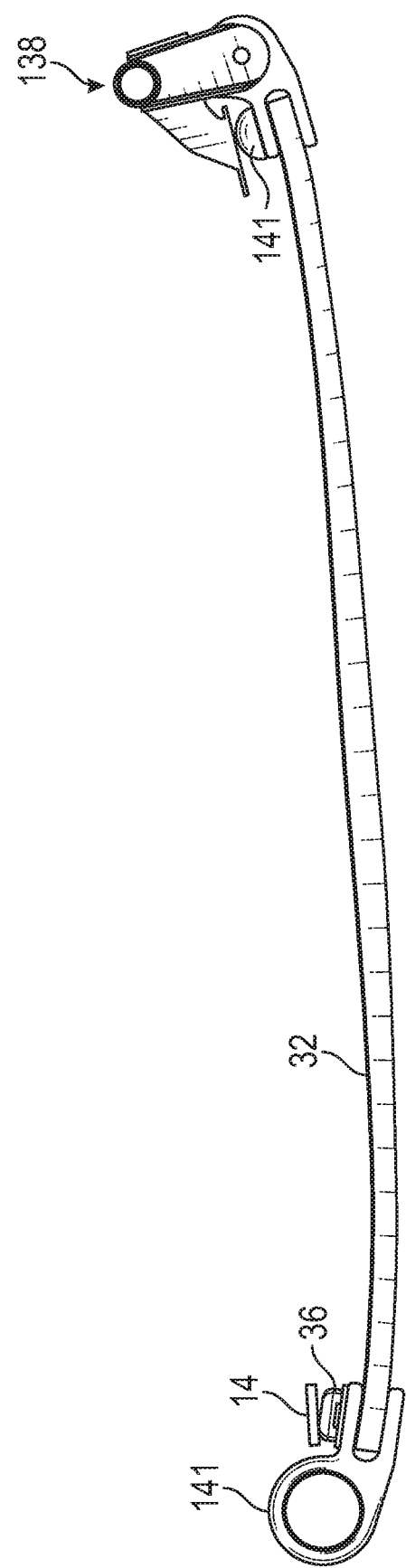
FIG. 10 is side, elevational view of the leaf spring of FIG. 7 deflecting during operation.

Referring now to FIGS. 8-10, with continued reference to FIG. 7, the second end 35 of the leaf spring 32 is disposed within a channel 137 defined by a compression shackle 138 that is coupled to a portion of the vehicle frame, such as chassis rail 14. The compression shackle 138 is coupled to the vehicle frame in any suitable manner. In the illustrated embodiment, the compression shackle 138 includes a first portion 140 that defines channel 137. The channel 137 is dimensioned to effectively clamp the second end 35 of the leaf spring 32 therein.

Engagement of the bumper 36 with the chassis rail 14 in response to spring deflection relative to chassis rail 14 initiates a second spring rate of the leaf spring 32 to provide desirable spring characteristics that facilitate specified suspension dynamics. The precise location of the bumper 36 along the length of the leaf spring 32 may be adjusted to determine how much spring deflection is required before contact between the bumper 36 and the chassis rail 14 occurs. Additionally, the compression shackle 138 that clamps the second end 35 of the leaf spring 32 allows the "effective length" of the leaf spring 32 to be further shortened, thereby increasing the spring rate of leaf spring 32 during deflection. Reducing the effective length of the leaf spring 32 refers to changing the fulcrum location of the leaf spring 32 from outermost ends to a different (i.e., inward) location.

The compression shackle 138 includes the above-noted first portion 140 which defines the channel 137. A shackle bumper 141 is operatively coupled to a top side of the first portion 140 of the compression shackle 138. As with bumper 36, the shackle bumper 141 may be formed of any suitable resilient material, including a polymeric material or rubber, for example. A second portion 142 of the compression shackle 138 is coupled to the first portion 140 in a manner that allows relative rotation of the first and second portions 140, 142. The second portion 142 includes a contact member 144 that is positioned to contact the shackle bumper 141 after sufficient deflection of the leaf spring 32 during operation.

Contact of the bumper 36 and/or the shackle bumper 141 during deflection of the leaf spring, as shown in FIG. 10, gradually decreases the effective length of the leaf spring 32, thereby increasing the rate of the leaf spring 32. With the bumper 36 and the compression shackle 138, each side 33, 35 of the leaf spring 32 provides parameters to adjust the rate progression without having to change the curvature or thickness profile of the leaf spring 32. By controlling the engagement of the bumper 36 and parameters of the compression shackle 138, the seat angle of the leaf spring 32 can be adjusted to a desired direction. The height of bumper 36 and/or shackle bumper 141, and resiliency of the material of the bumpers are factors that facilitate customization of the rate progression. Regarding the compression shackle 138, the radius of curvature, as well as the clamp length L, and position of contact between the shackle bumper 141 and the contact member 144 similarly facilitates customization.

It is further contemplated in another aspect of the invention that a second leaf spring is provided, with the additional leaf spring clamped to the leaf spring 32 with the retention assembly 34 in a stacked arrangement. Any of the previously described embodiments may be utilized with the stacked arrangement described herein. The additional leaf spring does not extend a distance that spans an entirety of the leaf spring 32 in some embodiments. Bumpers may be fixed to the additional leaf spring proximate ends thereof on a side of the additional leaf spring that is adjacent the leaf spring 32. In a relaxed condition of the leaf spring arrangement, the bumpers are spaced from the leaf spring 32.

Engagement of one or both of the bumpers with the leaf spring 32 in response to spring deflection initiates a third spring rate of the leaf spring arrangement to provide desirable spring characteristics that facilitate specified suspension dynamics. The precise location of the bumpers along the length of the additional leaf spring may be adjusted to determine how much spring deflection is required before contact between the bumpers and the leaf spring 32 occurs. Initiation of the third spring rate of the additional leaf spring may be adjusted based on the location of the bumpers. As with the bumpers of the leaf spring 32, such an arrangement provides flexibility of the spring response characteristics, while avoiding the need for a second leaf spring arrangement, thereby reducing the weight of the suspension system 10 and the overall vehicle.

The order of engagement of the bumpers 36, 141 of the leaf spring 32 with the chassis rail 14 relative to engagement of the additional leaf spring bumpers with the leaf spring 32 may be adjusted to control the spring response characteristics. In other words, bumpers of leaf spring 32 engage the chassis rail 14 prior to engagement of the bumpers of the additional leaf spring with the leaf spring 32 in some embodiments. In other embodiments, additional leaf spring bumpers engage the leaf spring 32 prior to engagement of the bumpers of leaf spring 32 with the chassis rail 14 in some embodiments. The use of the bumpers at the eye spring arrangement location avoids undesirable contact and rubbing of components with the composite material. Such contact and rubbing is detrimental to a composite spring and is a consideration that is not of concern to steel spring arrangements. It is to be appreciated that the multi-spring arrangement embodiments described herein may include springs that are each formed of steel, each formed of a composite, or a combination thereof. For example, in a two-spring arrangement, a main spring plate may be formed of steel, while a secondary spring plate may be formed of a composite material, or vice versa. Alternatively, the main spring plate and the secondary spring plate may be both formed of steel. Another alternative includes a main spring plate and a secondary spring plate that are both formed of a composite material. It is easily understood that the above-described example may be carried on to three or more spring arrangements.

Figure 11:
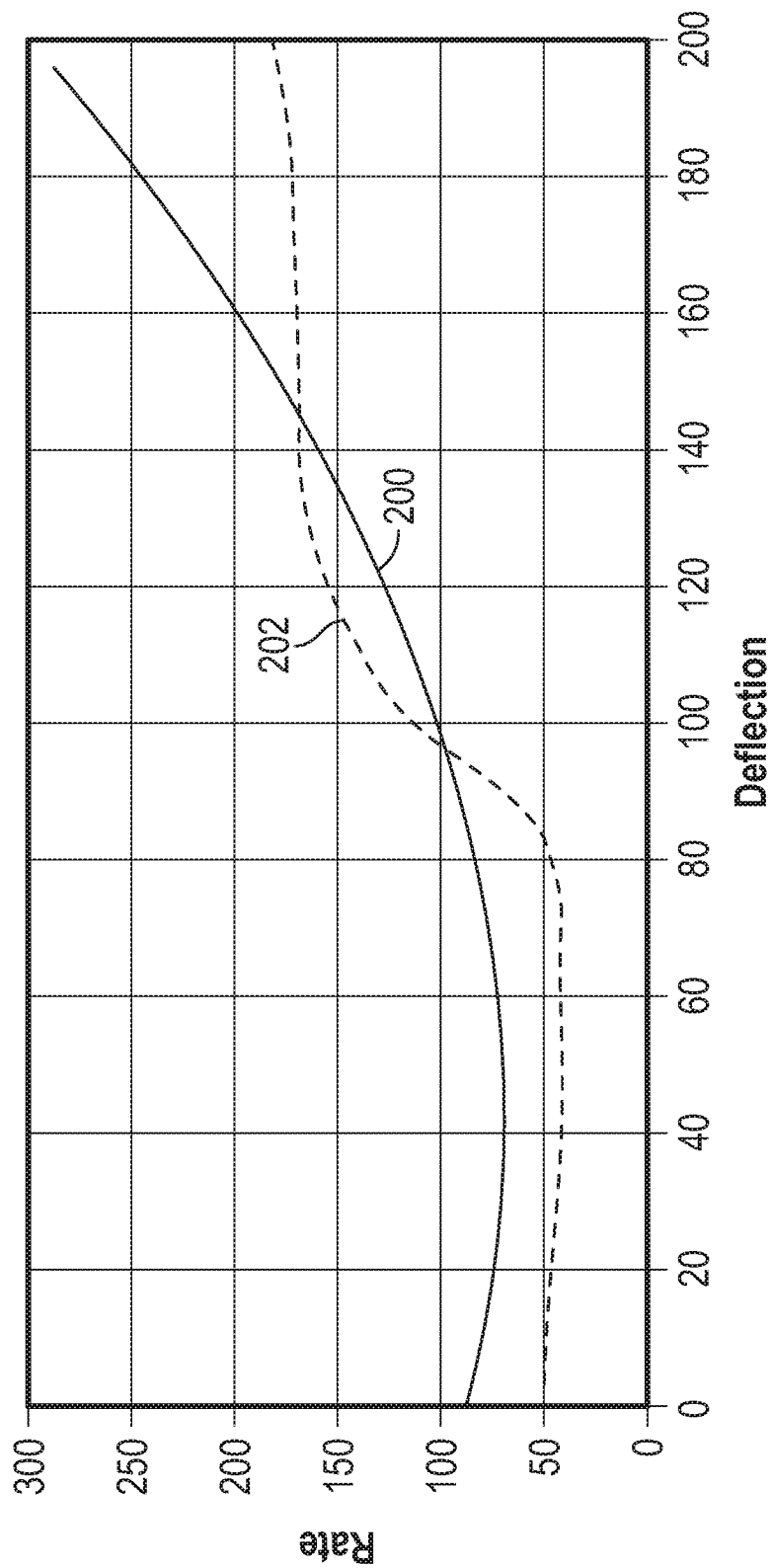
FIG. 11 is a plot of rate of the leaf spring against deflection comparing the leaf spring disclosed herein vs. a typical steel spring arrangement.

FIG. 11 illustrations a plot of rate of the leaf spring against deflection comparing the leaf spring disclosed herein vs. a typical steel spring arrangement. In particular, curve 200 depicts the rate change of the leaf spring 32 disclosed herein, when used in conjunction with the tension shackle or the compression shackle. The curve 200 is smooth when compared to the steep jump in rate change associated with prior multi-plate, multi-stage spring designs (represented with line 202).

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof

Having thus described the invention, it is claimed:

1. A variable rate leaf spring vehicle suspension system comprising:
    a vehicle frame;
    a single leaf spring extending from a first end to a second end;
    a tension shackle operatively coupled to the vehicle frame and defining a channel, the second end of the leaf spring disposed within the channel of the tension shackle;
    an eye spring bushing coupled to the vehicle frame, the first end of the leaf spring coupled to the eye spring bushing; and
    a bumper operatively coupled to the eye spring bushing and disposed between the eye spring bushing and the vehicle frame, the bumper spaced from the vehicle frame in a first condition of the leaf spring and configured to provide a first spring rate, and in contact with the vehicle frame in a second condition of the leaf spring, contact between the bumper and the vehicle frame configured to provide a second spring rate of the leaf spring.

2. The system of claim 1, wherein the bumper is formed of a polymeric material.

3. The system of claim 1, wherein the tension shackle is pivotably coupled to the vehicle frame.

4. The system of claim 1, further comprising a retention assembly operatively coupling the leaf spring to a vehicle axle.

5. The system of claim 1, wherein the single leaf spring is formed of a composite material.

6. The system of claim 1, wherein the single leaf spring is formed of steel.

7. A variable rate leaf spring vehicle suspension system comprising:
    a vehicle frame;
    a single leaf spring extending from a first end to a second end;

a compression shackle operatively coupled to the vehicle frame, a first portion of the compression shackle defining a channel that the second end of the leaf spring is disposed within, a second portion of the compression shackle pivotable relative to the first portion; and a shackle bumper coupled to the first portion of the compression shackle, the shackle bumper spaced from the second portion of the compression shackle in a first condition of the leaf spring, and in contact with the compression shackle in a second condition of the leaf spring, contact between the shackle bumper and the vehicle frame configured to gradually increase the spring rate of the leaf spring.

8. The system of claim 7, further comprising an eye spring bushing coupled to the vehicle frame, the first end of the leaf spring coupled to the eye spring bushing.

9. The system of claim 8, further comprising a bumper operatively coupled to the eye spring bushing and disposed between the eye spring bushing and the vehicle frame, the bumper spaced from the vehicle frame in a first condition of the leaf spring, and in contact with the vehicle frame in a second condition of the leaf spring, contact between the bumper and the vehicle frame configured to increase the rate of the leaf spring.

10. The system of claim 9, wherein at least one of the bumper and the shackle bumper is formed of a polymeric material.

11. The system of claim 7, further comprising a retention assembly operatively coupling the leaf spring to a vehicle axle.

12. The system of claim 7, wherein the single leaf spring is formed of a composite material.

13. The system of claim 7, wherein the single leaf spring is formed of steel.

\* \* \* \* \*